(12) United States Patent
Chhatwal et al.

(10) Patent No.: US 9,842,042 B2
(45) Date of Patent: Dec. 12, 2017

(54) DATACENTER MANAGEMENT COMPUTING SYSTEM

(71) Applicant: Bank of America Corporation, Charlotte, NC (US)

(72) Inventors: Raminder Chhatwal, Monmouth Junction, NJ (US); Suresh Nair, Robbinsville, NJ (US); Tal Sadan, Ringoes, NJ (US); Minesh Shah, Princeton Junction, NJ (US)

(73) Assignee: Bank of America Corporation, Charlotte, NC (US)

( * ) Notice: Subject to any disclaimer, the term of this patent is extended or adjusted under 35 U.S.C. 154(b) by 7 days.

(21) Appl. No.: 14/496,918

(22) Filed: Sep. 25, 2014

(65) Prior Publication Data

US 2016/0092343 A1    Mar. 31, 2016

(51) Int. Cl.
*G06F 11/36* (2006.01)
*G06F 9/445* (2006.01)

(52) U.S. Cl.
CPC ............ *G06F 11/3664* (2013.01); *G06F 8/65* (2013.01); *G06F 11/368* (2013.01); *G06F 11/3688* (2013.01)

(58) Field of Classification Search
CPC ..... G06F 8/61; G06F 8/65; G06F 8/71; G06F 11/368; G06F 11/3664; G06F 11/3688
USPC ........................................................ 717/177
See application file for complete search history.

(56) References Cited

U.S. PATENT DOCUMENTS

| | | | |
|---|---|---|---|
| 8,020,037 B1 * | 9/2011 | Schwartz | G06F 11/2094 714/41 |
| 8,762,486 B1 | 6/2014 | Butaud et al. | |
| 8,904,368 B2 * | 12/2014 | Haenel | G06F 8/61 717/147 |
| 2002/0166117 A1 * | 11/2002 | Abrams | G06Q 20/145 717/177 |
| 2003/0225867 A1 | 12/2003 | Wedlake | |
| 2004/0249975 A1 | 12/2004 | Tuck et al. | |
| 2006/0106585 A1 * | 5/2006 | Brown | G06F 8/20 703/1 |

(Continued)

OTHER PUBLICATIONS

Maranzano et al., "GDOC Geographically Dispersed Open Clusters", Feb. 2009, Symantec Inc., available at http://eval.symantec.com/mktginfo/enterprise/white_papers/b-whitepaper_ibm_gdoc_cont_avail_dr_solu_02-09_zsw03064.en-us.pdf, 19pg.*

*Primary Examiner* — Ryan Coyer
(74) *Attorney, Agent, or Firm* — Banner & Witcoff, Ltd.; Michael A. Springs

(57) ABSTRACT

A system may include an active first point of deployment (POD) configured to provide a specified business functionality and may include a first server and a first instance of a platform to provide the specified business function. A dark second POD may be configured to include a second server and a second instance of the platform template, where the first platform template instance comprises a different version than the second platform template instance. A POD management computing device may test an operation of the second POD in parallel with the operation of the first POD. The POD management computing device may upgrade the business functionality by deactivating the first POD and activating the second POD to provide the specified business function using the second instance of the platform template.

19 Claims, 8 Drawing Sheets

(56) References Cited

U.S. PATENT DOCUMENTS

| | | | |
|---|---|---|---|
| 2007/0157016 A1* | 7/2007 | Dayan | G06F 9/4416 713/2 |
| 2007/0283314 A1 | 12/2007 | Browning et al. | |
| 2010/0162226 A1 | 6/2010 | Borissov et al. | |
| 2012/0102226 A1 | 4/2012 | Hopmann et al. | |
| 2012/0260129 A1* | 10/2012 | Wilson | G06F 11/3688 714/32 |
| 2014/0281732 A1 | 9/2014 | Elias et al. | |
| 2014/0337830 A1* | 11/2014 | Schwaninger | G06F 8/61 717/177 |
| 2015/0106788 A1* | 4/2015 | Danko | G06F 11/3688 717/124 |
| 2016/0072730 A1* | 3/2016 | Jubran | H04L 43/08 709/224 |

* cited by examiner

DATACENTER MANAGEMENT COMPUTING SYSTEM

BACKGROUND

A business organization, such as a financial institution, may provide one or more business functions (e.g., a banking service, a brokerage service, and the like) to employees and/or customers via a network, such as the Internet. In doing so, one or more data centers, each having one or more servers, may be configured to provide a different aspect of the business function. For example, a data center may include a login server, an application server, a user interface server, and/or the like, where each server may be used to facilitate a different aspect of the business function. In many cases, different sets of servers may include a set of active servers to provide the functionality to users and/or a set of disaster recovery servers (e.g., a set of backup servers) to ensure continued operation of the business functionality during scheduled or unscheduled downtime of the active servers. Over time, one or more applications installed on the active servers and/or the backup server, or the servers themselves, may need to be updated. As such, the business organization may implement a process to upgrade one or more components included in the data center.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an illustrative example, a system may include an active first point of deployment (POD) communicatively coupled to a plurality of user devices via a network to provide a specified business functionality using client data communicated via the network. In some cases, the first POD may include one or more first servers and a first instance of a platform template. The platform template may configure the first servers to provide the specified business function. In some cases a dark second POD may be communicatively coupled to the network. The second POD may include one or more second servers and a second instance of the platform template operational on the one or more second servers. Further, a version of the first instance of the platform template may be different than the version of the second instance of the platform template. The system may further include a POD management computing device communicatively coupled to the network. The POD management computing device may utilize at least a portion of the client data for testing the second POD in parallel with an operation of the first POD. Further, after completion of the testing, the POD management computing device may perform an upgrade procedure by deactivating the first POD and activating the second POD to provide the specified business function using the second instance of the platform template.

In an embodiment, a system may include an active first point of deployment (POD) including a first data center configured to provide a business functionality to a user via a network. The first POD may include a first plurality of servers configured to operate using a first version of a platform template. The system may further include a dark second POD comprising a second data center configured to provide the same business functionality using a second plurality of servers. The second POD may operate using a second version of the platform template, where the second version comprises an upgrade of at least one component of the platform template. The system may further include a third backup POD comprising a third data center configured to provide the business functionality to the user via the network when the active POD is not available via the network. In some cases, an upgrade of at least one component of the platform template is performed by switching user communication from the first POD to the second POD.

In an embodiment, a method may include identifying, by a version manager, a first version of a platform template operational at a first point of deployment (POD) for providing a business functionality to a user via a network. The first POD may include a data center including one or more servers. In some cases, a configuration management computing device may determine whether a second version of a platform template stored in a template repository is ready for deployment, where the second version of the platform template is different than the first version of the platform template. When the second version of the platform template is ready for deployment, the configuration management computing device may configure a second POD at the datacenter to operate using an instance of the second version of the platform template. A switching tool may activate the second POD by routing communications received from one or more user devices from a user device via the network to the second POD and deactivate the first POD.

In an embodiment, an apparatus may include a communication interface, a processor communicatively coupled to the communication interface, and a non-transitory memory device storing instructions that, when executed by the processor, cause the apparatus to receive a message at the communication interface via a network. The apparatus may analyze the received message to determine a source of the message. After determining the source of the message, the apparatus may send, via the communication interface, the message to a first data center including a first point of deployment (POD) when the source of the message corresponds to a user device. In such cases, the first POD comprises a first version of a platform template and may be configured to provide business functionality to users communicating via the network. The apparatus may further be configured to send, via the communication interface, the message to a second data center comprising a second POD when the source of the message corresponds to a testing computer device. In some cases, the second POD may comprise a second version of the platform template that is different than the first version of the platform template.

In an embodiment, a system may include an active first point of deployment (POD) configured to provide a business functionality to users communicating via a network based on a first version of a platform template, a dark second POD configured with a different second version of the platform template and a switching tool to manage communication to and from the first POD and the second POD. In some cases, the switching tool may include a communication interface, a processor, and a non-transitory memory device. The non-transitory memory device may store instructions that, when executed by the processor may cause the switching tool to receive, via the network, a message at the communication interface, determine a source of the received message, and send the message to the destination based, at least in part, on the source of the received message. For example, the switching tool may send, via the communication interface, the message to a first data center comprising the first POD when the source of the message corresponds to a user device and send, via the communication interface, the message to a second data center comprising the second POD when the source of the message corresponds to a testing computer device.

In some embodiments, a system may include a network, one or more user devices communicatively coupled to the network, a first data center and a second data center each communicatively coupled to the network, and a switching tool. In some cases, the one or more user devices may access a business functionality provided by a business organization via a data center. The first data center may include an active first point of deployment (POD) configured with a first instance of a platform template for providing the business function. The second data center may include a dark second POD configured with a second instance of the platform template. Further, in some cases, the first instance of the platform template and the second instance of the platform template are associated with different versions of the platform template. In some cases, the switching tool may be configured to send messages received from testing computing system to the second POD. The switching tool may also determine whether messages received from the one or more user devices are to be sent to both the first POD and the second POD based on a testing profile for testing an operation of the second POD. If so, the switching tool may send messages received from the one or more user devices to the first POD and the second POD when indicated by the testing profile.

In some cases, a system may include a first point of deployment (POD) and a second POD at a data center. The first POD may a first set of servers based on a first hardware platform, and a first version of a platform template corresponding to the first hardware platform. The second POD may include a second set of servers based on a second hardware platform. The system may further include a configuration manager communicatively coupled via a network to the first POD and the second POD. Further, the configuration management device may include a communication interface, a processor communicatively coupled to the communication interface, and a non-transitory memory device communicatively coupled to the processor and storing instructions that, when executed by a processor, cause the configuration management device to at least determine, via the network, a difference between the first hardware platform and the second hardware platform and generate a second version of the platform template based on the difference between the first hardware platform associated and the second hardware platform. In some cases, the second version of the platform template may be installed on the second POD.

In some embodiments, a configuration management device may include a communication interface, a processor communicatively coupled to the communication interface, and a non-transitory memory device communicatively coupled to the processor. The non-transitory memory device may store instructions that, when executed by a processor, may cause the configuration management device to determine whether an application associated with a platform template has been upgraded and if so, determine whether each application associated with the platform template supports a same hardware platform. The configuration management device may then generate a first version of the platform template that includes a first set of applications associated with a first hardware platform and a second set of applications associated with the second hardware platform. In some cases, the upgraded application may be included in either the first set of applications or the second set of applications.

In some embodiments a method may include identifying by a configuration manager, a first version of the platform template associated with a first point of deployment (POD). The first POD may be configured to provide a business function to a user. The configuration manager may then determine whether a component of the platform template has been upgraded and identify a hardware version of a second POD, wherein the second POD is used for upgrading the platform template. A template generator may then generate a second version of the platform template based on the identified hardware version of the second POD. In some cases, the second version of the platform template may correspond to at least one upgraded component or the hardware version of the second POD. The configuration manager may then install the second version of the platform template on the second POD.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

Figure 1:
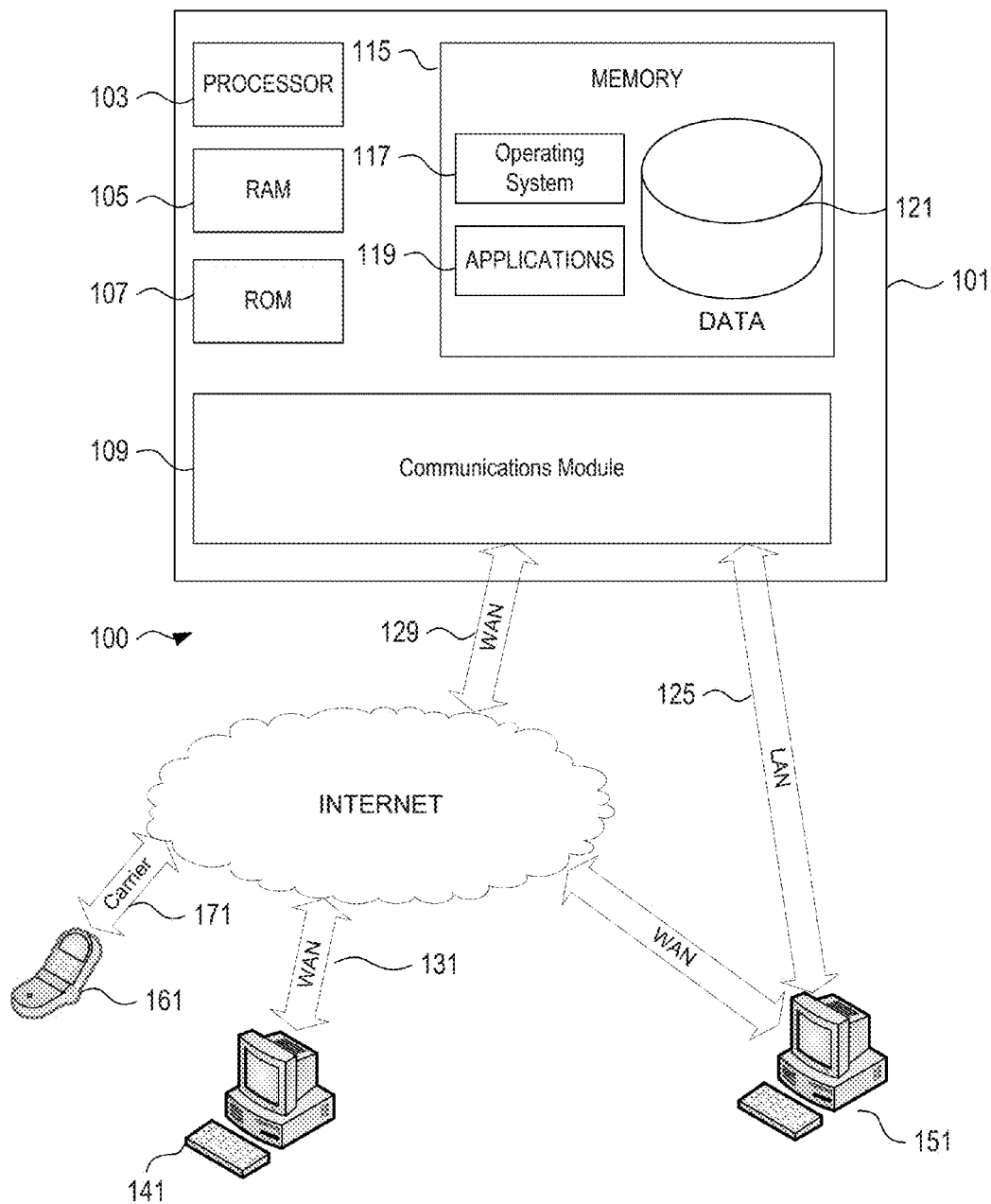
FIG. 1 shows an illustrative operating environment in which various aspects of the invention may be implemented.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

A business organization, such as a financial institution, may provide one or more business functions (e.g., a banking service, a brokerage service, and the like) to employees and/or customers via a network, such as the Internet. In doing so, one or more data centers, each having one or more servers, may be configured to provide a different aspect of the business function. Because customers and employees of the business organization may rely on continual access to the business functionality, downtime of the servers is undesirable. In some cases, such as during an upgrade procedure, downtime may be unavoidable. In some cases, an information technology (IT) department of the business organization may be able to schedule downtime to perform a software or hardware upgrade during off-peak hours, such as during overnight on weekends. However, for large business organizations with a global customer base, such off-peak hours may be severely limited due to business activities being scheduled across multiple time-zones. As such a need exists for an improved system and method for upgrading one or more components of a data center (e.g., a software application, a hardware component, and the like) while minimizing downtime of the data center that may interrupt user access to the business functionality.

In a current system, an IT department may configure a first version of an application (e.g., version 1.0) to run on a first set of servers in a data center to provide the business functionality to users via a network, such as the Internet or other network. A second set of servers may be configured as backups of the active set of servers to run the same version 1.0 of the application. When a new version (e.g., version 1.1) of the application is available, the IT department may test the application in an environment separate from the active server and the backup server, often using a set of test data separate from the user information processed by the application running on the active server. Once tested, the application on the active server must be stopped to perform the upgrade of the application, for example, from version 1.0 to version 1.1. For large applications, this downtime may last several hours, thus interrupting client access to the business functionality. Once the update is complete, the server may be re-activated and the process is repeated for the backup server. Because the newer version of the application has been tested in a separate environment, unanticipated problems may occur that may cause additional downtime of the active server as the problems are corrected. Further, because the previous version of the application may be uninstalled during the upgrade process, reverting back to the previously active version may be time intensive or, in some cases, not possible. As such, a need exists for an improved system and method for upgrading software and/or hardware components in a data center, while minimizing downtime of the provided business functionality from the perspective of a user.

As described herein, an upgrade procedure may include using two or more points of deployment (PODs). A POD may be a server, or set of servers, configured with a platform template associated with business functionality. The POD may be configured to provide specified business functionality (e.g., a banking interface, a brokerage interface, and the like) based on the one or more templates, such as a platform template, a server type template and a product template. For example, one or more applications may be used to provide at least a portion of the business functionality, such as a user interface screen, a login application, a monetary transfer functionality, and the like. In some cases, the one or more applications may be specified to be installed in a specific order on a server. The product template may then be configured to include an installation executable to install a plurality of applications in a specified order. A version of the product template may also be associated with a specified version of each of the plurality of applications. For example, an illustrative product template may be configured to install application A, Application B, Application N and Application C in this specified order, where a version (e.g., version 1.0) of the product template may be associated with version 1.3 of Application A, version 2.83 of Application B, version 5.2 of Application N, and version 1.92.3 of Application C, where a different version (e.g., version 1.2) may be associated with version 1.4 of Application A, version 2.83 of Application B, version 5.7 of Application N, and version 4.19.06 of Application C.

The server type template may include instances of one or more product templates. For example, a specified version (e.g., version 1.3) of a server type template may include an instance of a first product template (e.g., an instance of version 1.3 of a user login product template), an instance of a second product template (e.g., an instance of version 2.3 of a user interface product template), and/or the like. A server template may comprise an installation package to be installed on a server to provide a specified functionality. In some cases, the product template may be used to deploy a same server type across multiple data centers. In some cases, the same version of a server type may be deployed in a plurality of data centers. In other cases, a version of a server type may be generated based on a specific hardware configuration, a specified operating system operating on the server, and/or based on a version of an application included in a product. For example, when updating a server, hardware and/or software components may not be compatible with a particular version of an application. In an illustrative example, the IT department may purchase a server that is delivered with a specified operating system installed. In some cases, an application associated with a product instance included in a server type may not be compatible with the hardware or the operating system of the purchased serve. In such cases, the server functionality may be split between a first server type associated with a server running a first operating system and a second server type associated with a server running a second operating system. In some cases, the server type may be compatible with a virtual server, a physical server or both a virtual server and a physical server.

A platform template may include instances of one or more server types. For example, a platform template may be associated with a data center providing the business functionality and may include one or more server types, such as a login server, an application server, a user interface (UI) server, a security server, a policy server, and the like. A version of the platform template may be associated with a particular combination of server type instances. For example, a version (e.g., version 1.3) of the platform template may include one or more of an instance of a login server template (e.g., version 1.2), an instance of a UI server template (e.g., version 2.3), an instance of an application server template (e.g., version 1.1) and an instance of a policy server (e.g., version 1.3).

In some cases, a point of deployment (POD) implementation may be used based on the platform templates. For example, a POD may comprise a data center associated with a platform template. For example, a POD may comprise a data center providing specified business functionality, such as a personal banking interface, a brokerage interface, a financial advisor interface, and/or the like. In some cases, a data center may include an active POD in active communication with one or more user devices via a network, such as the Internet or a private network internal to the business organization. A data center may comprise one or more of the active first POD providing the business functionality to a plurality of users and a backup POD, configured similarly to the active first POD, where the backup POD ensures continued access to the business functionality in cases when the active first POD is unavailable, such as in situations due to communication issues and/or hardware failures.

The data center may also include a "dark" third POD, where the dark POD is actively communicating on the network, but is not accessible to via a user device. Instead, the dark POD may be configured with an instance of the updated version of the platform template. By operating the dark POD in parallel with the active third POD, the new platform template may be tested using both of a standardized set of test data stored in a data repository and actual "live" data received from the user device. The dark POD may be configured to process the live data in a same manner as the live POD, but responses generated by the dark POD are not directed to the originating source device. Rather, a "swing" tool (e.g., a switching tool) operating on the business network may direct the communication to an internal test device to ensure proper operation of the new version of the platform template and to ensure the dark POD is operating as expected. The swing tool may be configured to direct messages based on a source associated with each message. For example, the swing tool may be configured to receive all messages communicated to the live POD, the dark POD and/or the backup POD. The swing tool may then examine each message to identify a source of any particular message. Based on the source device of the message, an incoming message may be routed to the live POD when the source device corresponds to a user device, to the backup POD when the source device corresponds to a user device and the live POD is unavailable, and to the dark POD when the source device corresponds to a testing computer system on the business network. In some cases, the swing tool may be configured to communicate a message received from a user device to the dark POD based on a testing protocol. For example, an illustrative testing protocol may specify that once the dark POD meets specified criteria (e.g., completion of a specified series of tests, a response time metric, an indication of proper error handling, and the like), the dark POD functionality may be tested using the live data to ensure consistent operation from a user's perspective.

By instantiating the platform template using the dark POD/live POD structure for deployment of upgrades and/or installation of new data centers may result in increased deployment efficiency and/or reduced overall support costs. For example, a platform template allows for a particular combination of applications and servers to be used in a number of similar data centers, where the data centers may be geographically distant. (e.g., a first data center may be located in Europe to serve a European customer base, a second data center may be located in the Americas to serve an American customer base (e.g., North America, South America, Central America, and the like), a third data center may be located in Asia to serve an Asian customer base, and the like.). By using a same platform template, each instance of the platform template may be installed from a same remote location, testing of each instance of the platform template may be performed from a centralized location and/or use a common data set, regional testing may be performed on-site to ensure regional differences (e.g., supported languages, supported currencies, regional policies, and the like) are supported as expected by using live client data from the deployment region. Further, downtime can be reduced by completing the testing of the dark POD before deactivation of the live POD. In some cases, the switching tool may be used to deactivate the live POD and to activate the dark POD, such as by changing a mapping of a destination address of messages received from the user devices from the deactivated live POD to the activated dark POD. Once the dark POD has been activated, the former dark POD becomes the new live POD and the former live POD may be deactivated to be used as one of a new dark POD or for updating the backup POD, using a similar method.

In many cases, the previous updating process may cause the data center to be down for an extended period of time (e.g., about a half an hour, about 2 hours, about 20 hours, about a weekend, and the like). Because the previous updates may be performed by updating individual applications, server hardware, operating systems and the like, downtimes of the datacenter may be unpredictable. Using the dark POD/live POD structure, downtimes may be reduced to a matter of minutes (e.g., about a minute, about 10 minutes, and the like). Further, because some errors may not be observable until after the data center has been upgraded, it may be desirable to revert the data center to a previous version of the platform template. However, reversion to a previous version of the data center functionality may not be possible following an upgrade under the previous methods. By using the POD structure and the platform templates, reversion to a previous version may be as simple as deactivating the newly activated POD and reactivating the previously active POD. Further, if each application is installed separately, the resulting configuration and/or interoperation of the applications may be unpredictable. However, by using the product templates, the interoperation of the different applications may be more predictable and less likely to cause unexpected errors.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
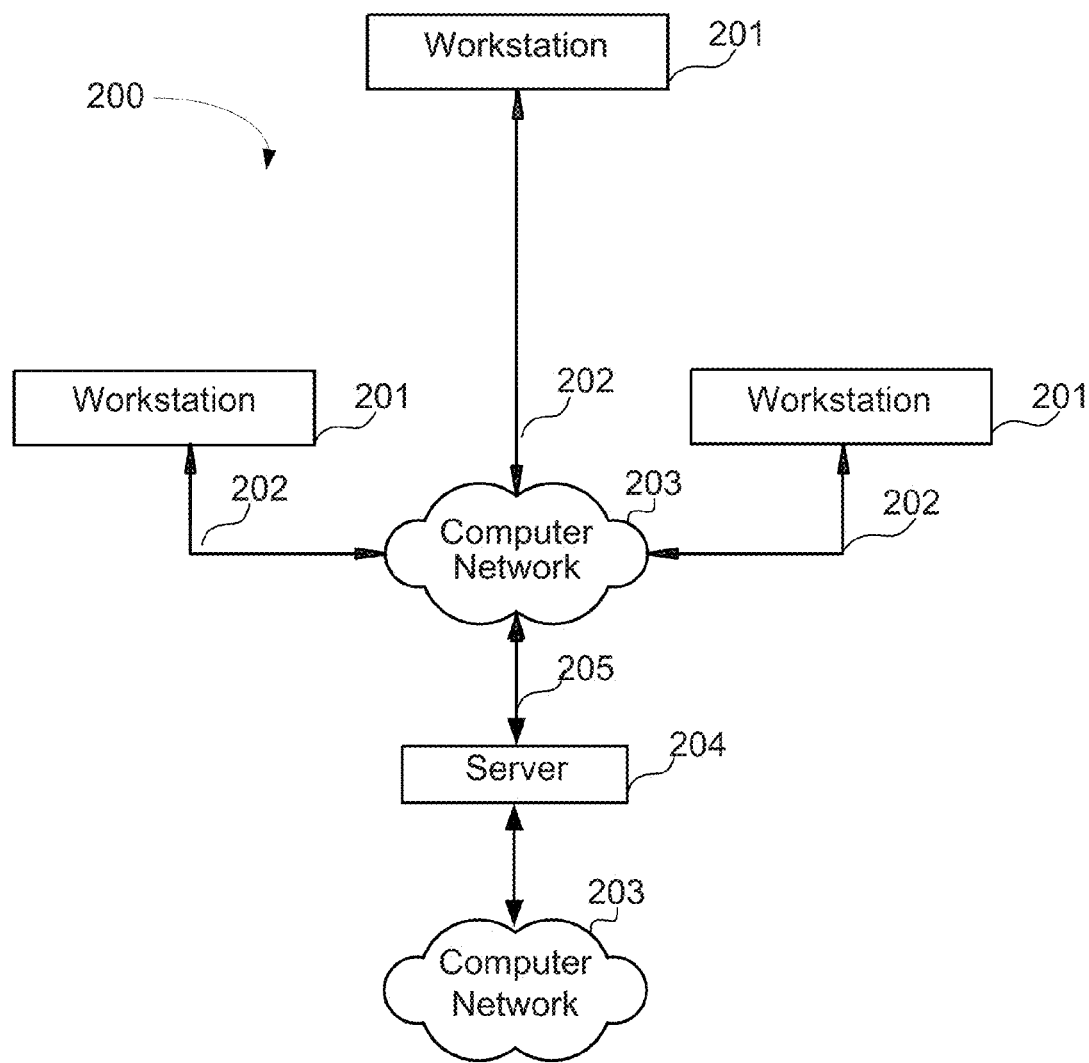
FIG. 2 is an illustrative block diagram of workstations and servers that may be used to implement the processes and functions of certain aspects of one or more aspects of the present disclosure.

Referring to FIG. 2, an illustrative system 200 for implementing methods according to the present invention is shown. The system 200 may be a risk management system in accordance with aspects of this invention. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links. Connectivity may also be supported to a CCTV or image/iris capturing device.

The steps that follow in the figures may be implemented by one or more of the components in FIGS. 1 and 2 and/or other components, including other computing devices.

Figure 3:
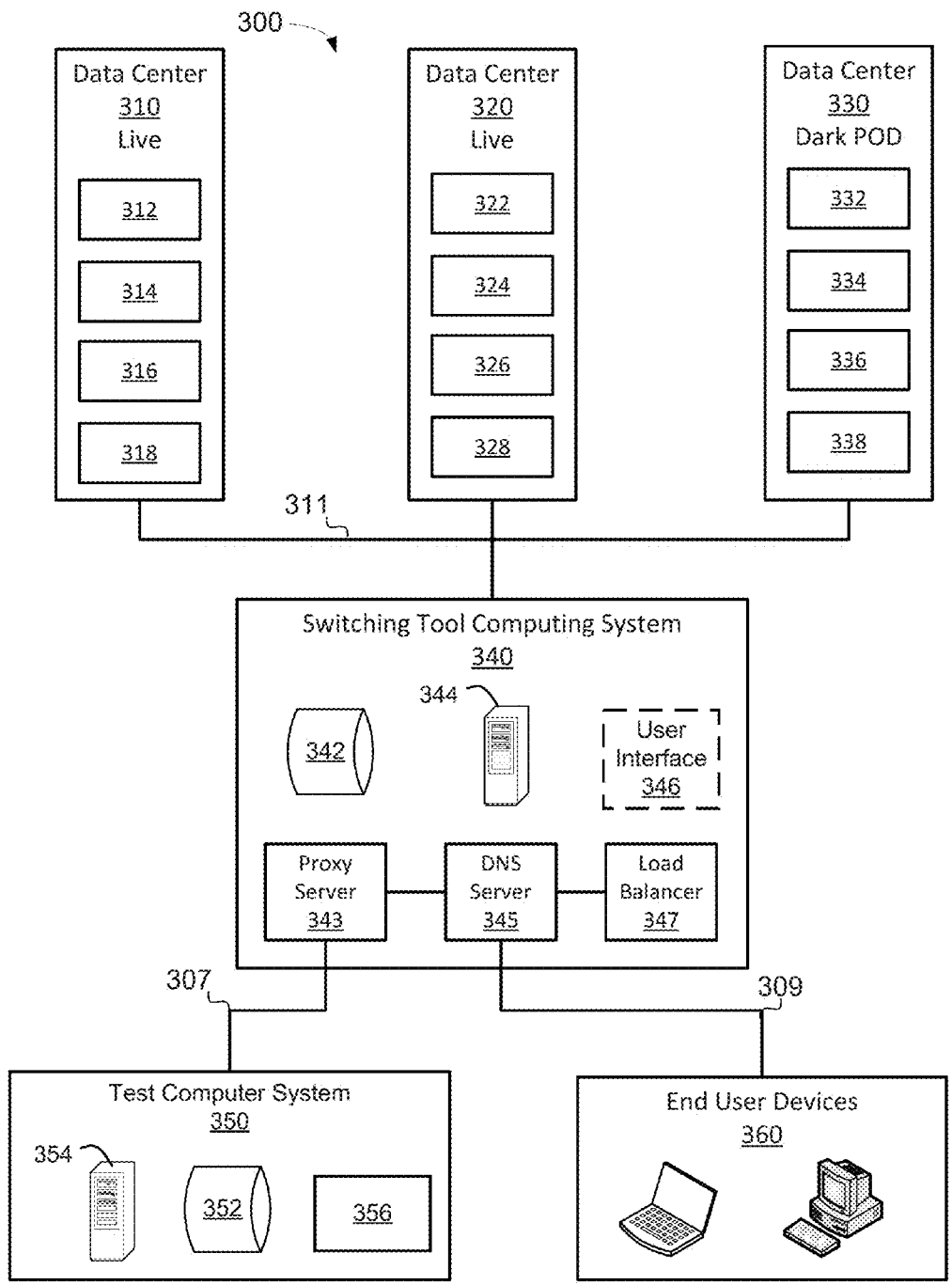
FIG. 3 is an illustrative block diagram of a system for managing two or more points of deployment of a platform template according to one or more aspects of the present disclosure.

FIG. 3 is an illustrative block diagram of a system 300 for managing two or more PODs 310-330 of a platform template according to one or more aspects of the present disclosure. For example, the system 300 may include one or more data centers (e.g., the PODs), a switching tool computing system 340, and a test computing system 350. In some cases, the first POD 310 may be considered "live" and, therefore, configured to provide a specified business function to one or more users when accessed via one or more user devices 360. For example, the business function may correspond to a banking function via a personal banking interface (e.g., an account management interface, a monetary transfer interface, a bill-pay interface, and the like), a brokerage function (e.g., a trading interface, an account management interface, an investment analysis interface, and the like), or other such functionality. In some cases, the data center may comprise a first POD 310 that may provide internal business functions to employees of the business organization, such as an advisor interface functionality accessed by a financial advisor employed by a financial institution. The first POD 310 may include one or more servers 312-318 such as a login server 312, an application server 314, a user interface server 316, and/or a policy server 318. In some cases, the system may further include a second live data center including a second POD 320, where the second data center may be configured as a backup data center to ensure continued operation of the specified business function when the first POD 310 is not operational or otherwise offline. The second POD may further include a login server 322, an application server 324, a user interface server 326, and/or a policy server 328.

In some cases, the first POD 310 and the second (e.g., backup) POD 320 may both comprise an instance of a same version of a platform template to provide the business function. In some cases, a third data center may comprise a "dark" (e.g., inactive) POD 330. The dark POD 330 may include an updated version of the platform template and may include one or more of a login server 332, an application server 334, a user interface server 336, and/or a policy server 338. The update may include an update to at least one application from the first version of the platform template installed on the live first POD 310 and the backup second POD 320. In some cases, the platform template comprise an update to support an hardware update to a server at the data center 330 or an update to an operating system installed at the data center.

In an illustrative example, one or more users may access the business functionality provided by the first POD 310 using one or more user devices 360 communicating via a network 309. In some cases, a switching tool computing system 340 may be communicatively coupled to the user devices 360 via the network 309 (e.g., the Internet, a WAN, a LAN, and the like.) and to the data centers 310, 320, and 330 via a network 311. A test computer system 350 may be communicatively coupled to the switching tool computing system 350 via a network 307 (e.g., a LAN, a WAN, and the like). The testing computer system 350 may include a data repository 352, one or more computing devices 354, and/or a user interface 356. In some cases, the data repository 352 may store instructions that, when executed by the one or more computing devices 354, may cause the testing computer system 350 to test an operation of the dark POD 330 using a testing protocol and/or test information stored in a data repository 352. In some cases, a user may configure and/or modify the testing protocol via one or more user interface screens. In some cases, the user may view a report indicating a status of the testing of the dark POD 330. In some cases, either as part of an automated testing protocol or via a user command, the testing computer system may command the switching tool computing system to allow live user information received from the user devices 360.

The switching tool computing system 340 may include one or more of a data repository 342, a computing device 344 and, optionally a user interface 346. In some cases the user interface may be remote from the switching tool computing system, such as a web interface interactively displayed on a remote web interface. The switching tool computing system may further include a proxy server 343 communicatively coupled to the networks 307 and 311 and a DNS server 345 communicatively coupled to the networks 309 and 311. In some cases, the switching tool computing system 340 may further include a load balancer 347. In some embodiments, the switching tool computing system may further include a configuration management computing system 370 for managing the configuration of the live first POD 310, the backup second POD 320 and/or the dark third POD 330.

In some embodiments, users may access the business functionality provided by the live POD 310, by sending a communication request from a user device 360 via the network 309. This request may include, among other information, a URL of the live first POD 310. A URL resolution query may be received by the DNS server 345. The DNS server 345 may process the URL, such as by traversing one or more topology records, such as topology records stored in the data repository 342 and, based on the source IP address, the DNS server 345 may associate the URL obtained from the message received at the switching tool computing system 340 to an IP address. In some cases, the switching tool computing system 340 may receive a message from the test computing system 350 via the network 307 to be received by the proxy server 343.

If a source IP address associated with the received message corresponds to a user device 360, the DNS server may resolve the URL associated with the message and send a response to the requesting user device 360 with the IP address of the live data center including the first POD 310. In some cases, a message received at the proxy server 343 via the network 307, may be indicative of a message sent from the test computing system. In such cases, if the source of the IP request received at the proxy server 343, the DNS server 345 may resolve URL and send the response to the origination user device 360. If a message is received at the switching tool computing system 340 may originate at the live data center 310 and/or the backup data server. In response to the received message is processed by the DNS server to resolve the URL and send the response with an IP address associated with the data center and send the response with an IP address of the live data center. If, however, the request source of a message received from our client, the DNS server may process the URL and send a response with an IP address of the live POD 310. If the source IP of the Dark POD 330 is associated with the received message, the DNS server 345 may resolve the URL and send a response with an IP address associated with the dark POD 330.

In an illustrative example and as discussed above, a first POD 310 may be associated with providing the business function and may be associated with the live first data center and the third POD 330 may be associated with the a dark data center. In some cases, a new version of the platform template is deployed on the dark POD 330. The test computer system 350 may automatically test the operation of the dark POD 330 without impacting live communication between the live POD 310 and the user devices 360. In some cases, the switching tool computing system may be configured to "swing" (e.g., switch) the live first POD 310 and the dark third POD 320, such as on a predetermined date, and/or at a predetermined time. In some cases, the swing of the first POD 310 with the third POD 320 may occur within a matter of minutes (e.g., about 1 minute, about 2 minutes, about 5 minutes, and the like). Following the swing, the first POD 310 may now be configured as the backup POD to the newly active third POD 330. In some cases, the second POD 310 may become the inactive dark POD. In some cases, the upgrade process may occur on a regular basis, such as monthly, or at the expiration of a predetermined event, such as an expiration of a timer and/or an updated version of the platform template being generated.

Figure 4:
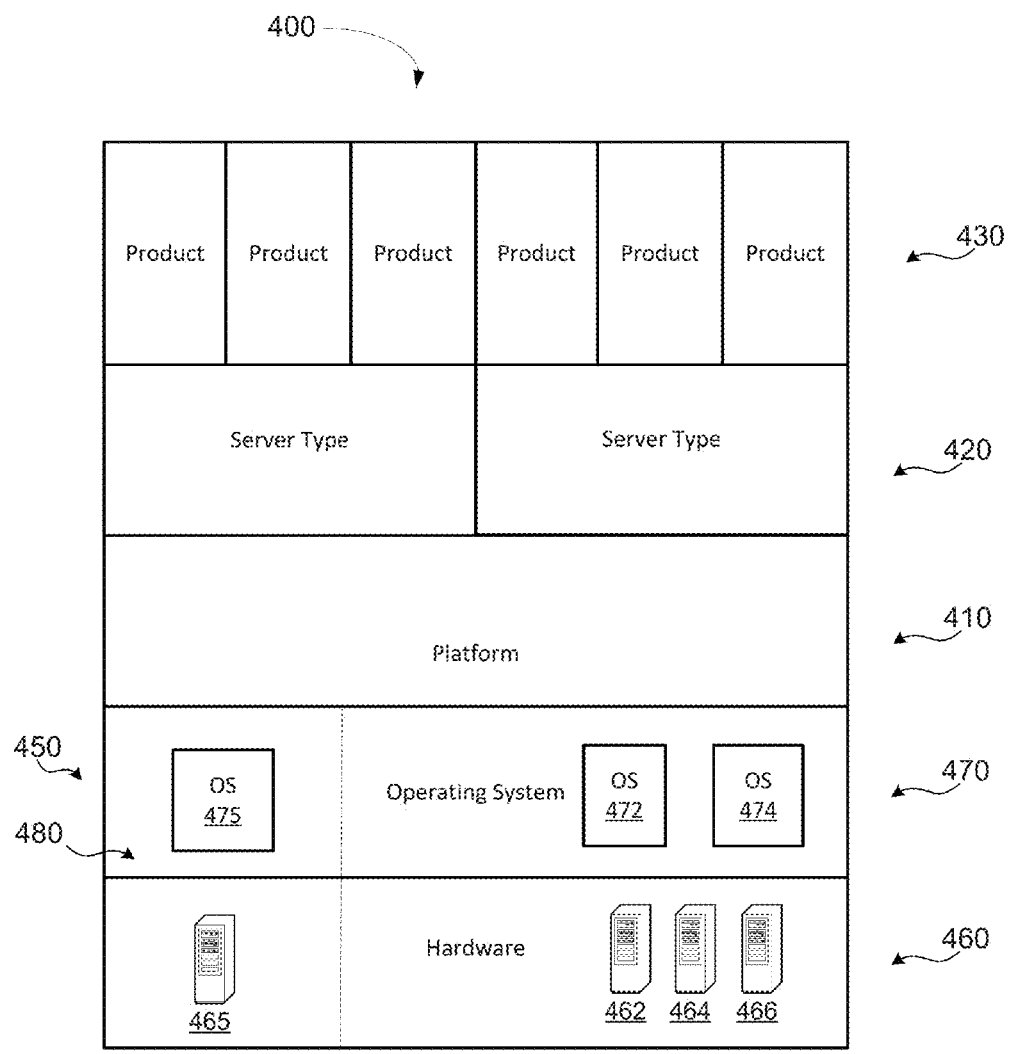
FIG. 4 comprises an illustrative block diagram of a platform template according to one or more aspects of the present disclosure.

FIG. 4 comprises an illustrative block diagram of a platform template 400 according to one or more aspects of the present disclosure. The platform template may include one or more instances of a platform template 410, wherein the platform template may be associated with a hardware platform 450 comprising a hardware type 460 (e.g., a server) and an operating system 470. The hardware platform 450 may include one or more hardware types 462, 464, 466 and/or operating systems 472, 474. The platform template 410 may include one or more server type instances 420. Each server type instance may include one or more product instances 430. The server type instances 420 may correspond to one or more of a hardware server type and/or a functionality performed by the server type. For example, the one or more instances of the server type templates may be configured to provide a specified functionality (e.g., a print server, a login server, an application server, and/or the like), or operate on a specified hardware type 460 and/or using a specified operating system 470. In some cases, the platform template 410 may be associated with one or more critical services 480 (e.g., a security platform) which may comprise a specified server hardware 465 and/or operating system 475.

Figure 5A:
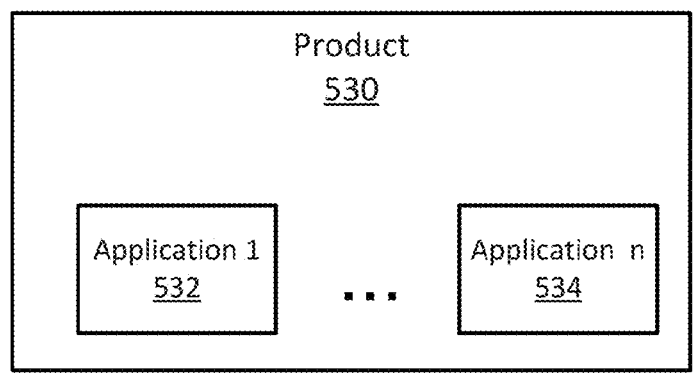
FIG. 5A comprises an illustrative block diagram of a product template according to one or more aspects of the present disclosure.

FIG. 5A comprises an illustrative block diagram of a product template 530 according to one or more aspects of the present disclosure. In the illustrative example, the product template 530 may include one or more applications 532, 534. Each version of the product template may include a different combination of applications, where the combination of applications may vary by a version of the application, a supported operating system or hardware platform, and/or the like. Also, the each version of the product template 530 may also include an order of installation of the applications 532, 534 and/or configuration information associated with each of the applications 532, 534. In some cases, an instance of the product template 530 may comprise an installation package, such as an executable installation package to install each of the applications for installing the applications, in a specified order. The product template may also comprise a different configuration file associated with each version of the product template to facilitate installation and configuration of the product template onto particular server hardware.

Figure 5B:
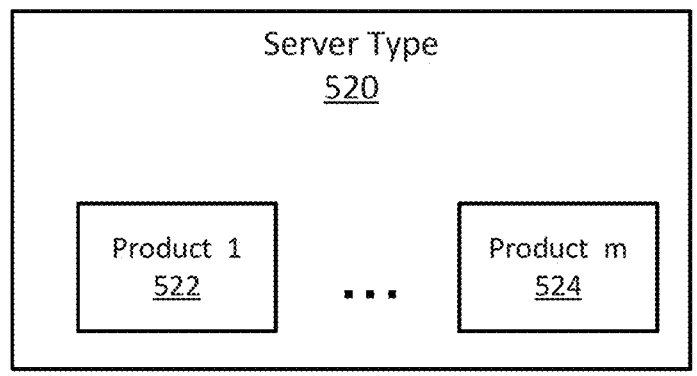
FIG. 5B comprises an illustrative block diagram of a server template according to one or more aspects of the present disclosure.

FIG. 5B comprises an illustrative block diagram of a server template 520 according to one or more aspects of the present disclosure. In some cases, the server template 520 may include one or more product type instances 522, 524. The server type (e.g., the template 520) may be associated with particular server functionality (e.g., a web server, a login server, an application server, a policy server and the like). Each server type template may include a configuration file for use in determining an installation order for the different product instances.

Figure 5C:
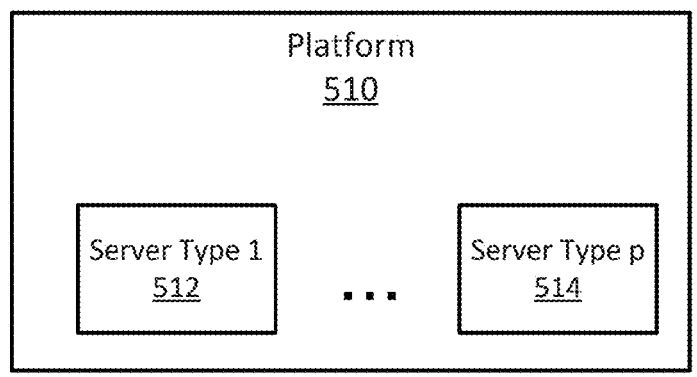
FIG. 5C comprises an illustrative block diagram of a platform template according to one or more aspects of the present disclosure.

FIG. 5C comprises an illustrative block diagram of a platform template 510 according to one or more aspects of the present disclosure. As discussed above the each platform template 510 may comprise one or more server type instances 512-514. The server types associated with the platform template 510 may correspond to a particular functionality provided by a data center and/or a specified hardware type being used at the data center.

Figure 6:
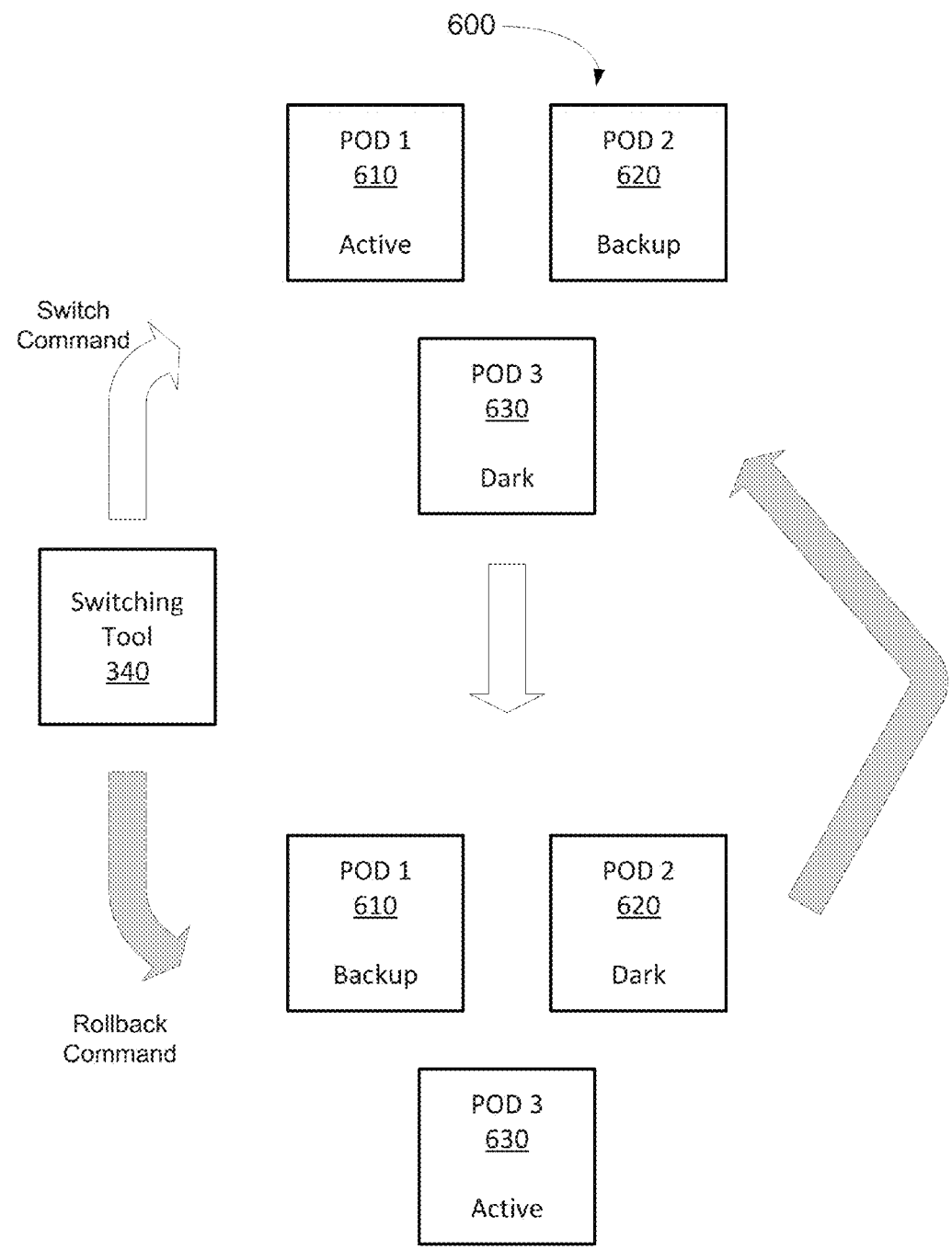
FIG. 6 comprises an illustrative block diagram of an activation procedure of a dark POD according to one or more aspects of the present disclosure.

FIG. 6 comprises an illustrative block diagram 600 of an activation procedure of a dark POD according to one or more aspects of the present disclosure. In this illustrative example, a data center may comprise three PODs. The first POD 610 may include an active live POD that may be configured to perform a specified business function. An active second POD 620 may be configured as a backup to the first POD 610. Further the system may include a switching tool (e.g., a swing tool) test and activate the dark POD 630. For example, the switching tool may monitor the operation of the active PODs 610 and the inactive dark POD. In some cases, a switching tool, such as the switching tool computing system 340 discussed above, may facilitate communication between the PODs 610, 620, 630 and the world at large. For example, the switching tool may comprise a proxy server for interfacing with a test computer device and a DNS server for decoding a received POD for a message. In some cases, such as at an end of a successful test period, the switching tool may receive (or generate) a switching command. The switching command, when processed by the switching tool, may cause the first pod 610 to be deactivated and the third POD 630 to be activated. The backup POD 620 may remain active. In some cases, the backup POD may be switched to being the dark POD and the active POD may be switched to being the backup POD. This switch procedure may further be done to ensure that the backup POD is operating using a desired version of the platform template.

In some cases, one or more errors with the platform template (e.g., a missing application, a wrong version of the application, and the like). In such cases, the switching tool may generate a rollback command, for rolling back the platform update by changing the status of the PODS 610, 620, and 630 in which the newly activated third POD 630 may be deactivated (e.g., converted back into a dark POD status) and the first POD 610 may be reactivated as the live POD to provide the business function to the user device. Once the PODS have been rolled back, the dark POD 630 may be subjected to further tests to ensure proper operation the platform template. In some cases, the further testing may include updating the dark POD 630 to a different, corrected platform template.

Figure 7:
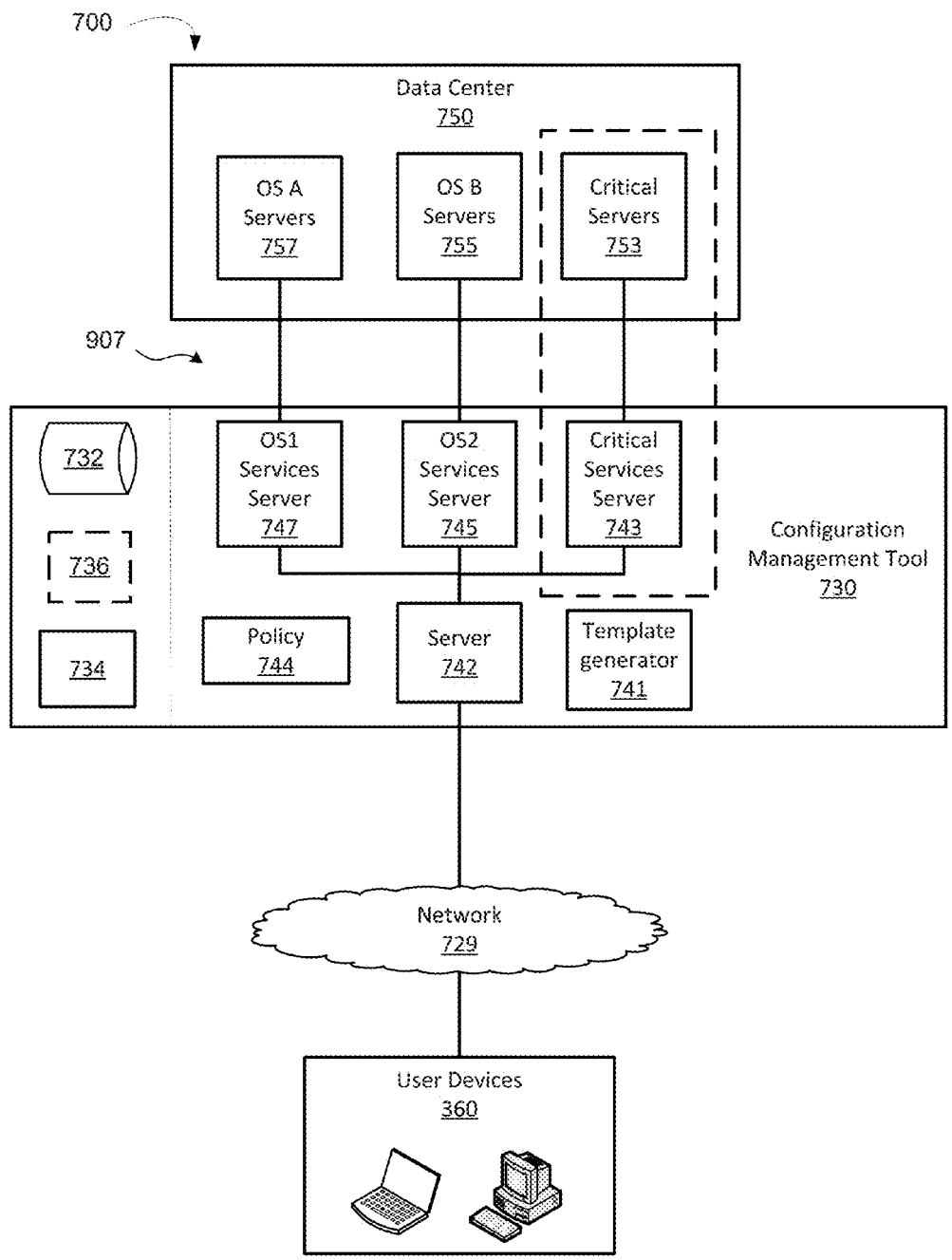
FIG. 7 comprises an illustrative block diagram of a configuration management tool for managing a configuration of one or more PODS.

FIG. 7 comprises an illustrative block diagram of a system 700 including a configuration management tool 730 for managing a configuration of one or more PODs that may be operational at a data center 750. For example, the configuration management tool 730 may include a data repository 732, a computer device 734 and/or a user device 736. In some cases, the configuration management tool may allow for content switching to enable load balancing so that requests for information may be redirected to different servers based on a policy. For example, a content switching configuration used by the configuration management tool 730 may include a content switching server (e.g., a virtual server) and a load balancing configuration comprising one or more load balancing virtual servers, load balancing services and load balancing policies. For example, when a request from the one or more user devices 360 is communicated to the configuration management tool 730, the configuration management tool 730 may apply an associated policy 944 based on the particular request. A priority of the policy 944 defines the order in which the policies bound to the configuration management tool 730 are evaluated. In some cases, one or more policies may be stored in the data repository 732. After evaluating the policy 744, the configuration management tool 730 may route the request to the appropriate load balancing virtual server, such as the server 742 that, in turn, sends it to an appropriate service to be sent to the appropriate server (e.g., POD) of the data center 750. For example, a service associated with a first operating system may forward a message to a first OS services server 747 in communication with one or more servers 757 associated with applications running on the first operating system, a service associated with a second operating system may forward a message to a second OS services server 745 in communication with one or more servers 755 associated with applications running on the second operating system, and a service associated with one or more critical applications may forward a message to a critical services server 743 in communication with one or more servers 753 associated with applications that are critical to the operation of the business function, such as a security application.

In an illustrative example for a particular business function, a configuration management tool may process a policy that cause requests received from one or more user devices 360 to redirect requests to different web servers based on a migration path for migrating applications from running on a server with a first operating system to running on a server with a second operating system. Further, an additional policy caused isolation of critical servers and the associated applications, such as by isolating security specific user interface functionalities from the rest of the web services to maintain the integrity of the security policies.

A migration path may be implemented by using at least one POD at a data center, where a first POD at a data center may include a first set of servers based on a first hardware platform and a first version of a platform template corresponding the first hardware platform. The data center may further include a second POD comprising a second set of servers based on a second hardware platform. The configuration management tool 730 may be communicatively coupled via a network to the first POD and the second POD, where the configuration management tool 730 may be configured to process one or more policies stored in the data repository 732 to determine, via the network, a difference between the first hardware platform of the first POD and the second hardware platform of the second POD. Based on the difference, the configuration management tool may be configured to generate a second version of the platform template based on the difference between the first hardware platform associated and the second hardware platform and to deploy the second version of the platform template on the servers at the second POD.

In some cases, a difference between the first hardware platform and the second hardware platform may comprise a difference in a server type, such as a manufacturer of the server, a difference in processors between the first hardware platform and the second hardware platform, a difference in device controllers associated with the first hardware platform and the second hardware platform, and the like. In some cases, a difference between the first hardware platform and the second hardware platform may comprise a difference in operating systems installed on the first hardware platform and the second hardware platform. In some cases, the operating systems may be different minor versions of the same operating system (e.g., OS1.aa and OS1.bb), a difference between a first major release of an operating system and a second major release of the operating system by a same vendor (e.g., OS1.aa and OS2.bb), or a difference between an operating system supplied by a first vendor and a different operating system supplied by a second vendor (e.g., OS A and OS B). In some cases, the difference between the first hardware platform and the second hardware platform may comprise a difference in both hardware components and operating system components.

In some cases, the configuration management tool may be configured to identify the first hardware platform associated with the first POD, determine, based on the first hardware platform, whether a version of the platform template exists in a platform template data repository (e.g., data repository 732) that corresponds to the first hardware platform. If an appropriate version of the platform template does not exist, then the configuration management tool 730 may initiate generation of a corresponding version of the platform template comprising instances of applications that support the hardware platform and instances of server types associated with the first hardware platform. For example, the configuration management tool may be capable of determining determine whether each of a plurality of application components associated with the platform template are operational on a same hardware platform, and if not generate a third version of the platform template comprising a first set of applications associated with a first server type and a second set of applications associated with a second server type. In such cases, the first set of applications may support the first operating system and/or a first hardware platform and the second set of applications may support the second operating system and/or a second hardware platform. The configuration management tool 730 may further install the generated third version of the platform template on a third POD, wherein the third pod includes a first server type for running the first set of applications and a second server type for running the second set of applications.

Figure 8:
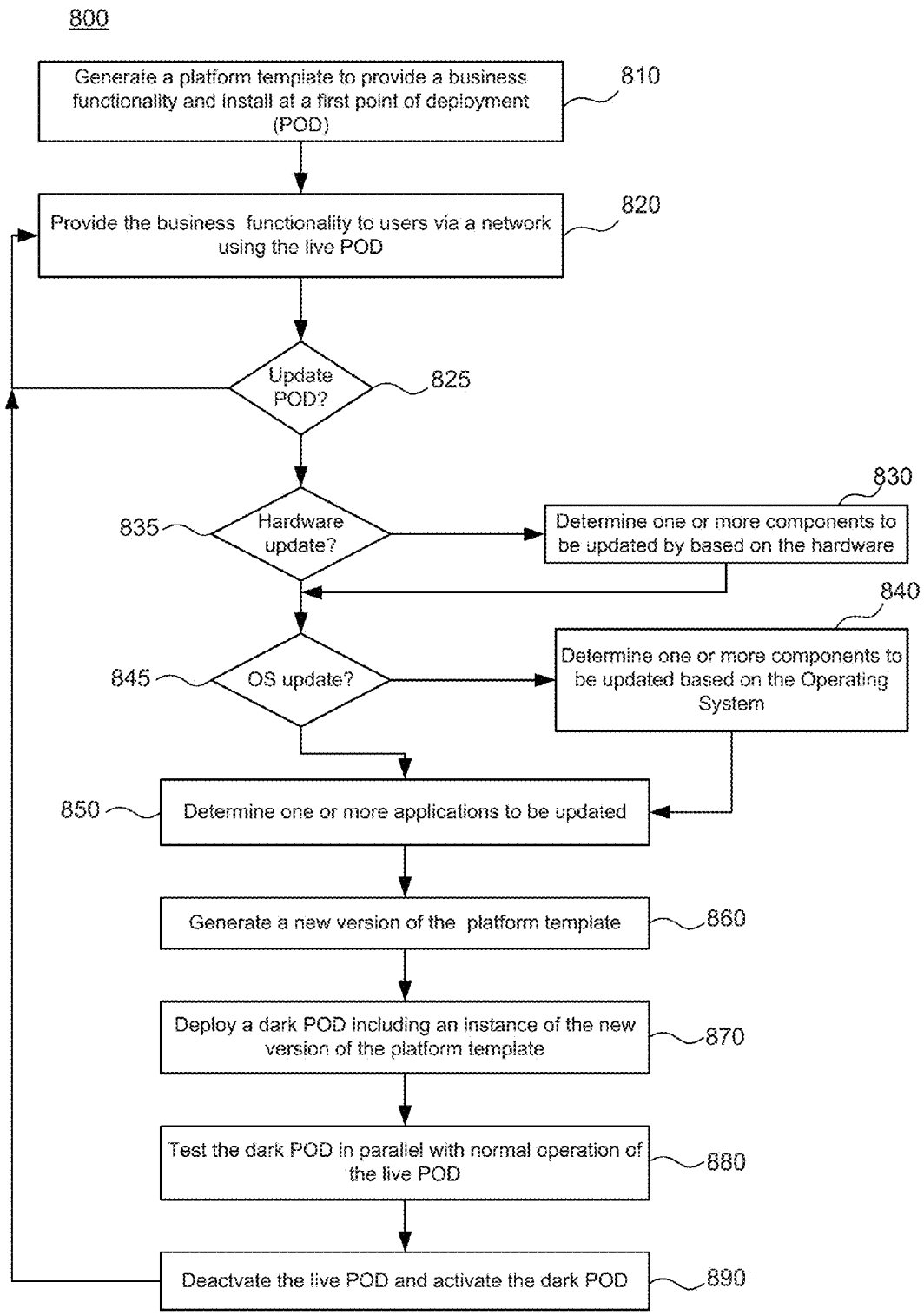
FIG. 8 is a flowchart of an illustrative method for managing an upgrade procedure of one or more data centers based on using a platform template.

FIG. 8 is a flowchart of an illustrative method 800 for managing an upgrade procedure of one or more data centers based on using a platform template according to some embodiments. At 810, a configuration management device may generate a platform template to provide desired business functionality to one or more users. The users may be customers and/or employees of a business organization. An instance of the platform template may be installed in a data center that may be configured to include one or more servers organized as a point of deployment (POD). At 820, upon completion of testing, the POD may be activated and the business functionality may be provided to users via the live POD. For example, the users may access the business functionality via a network interface.

At 825, the configuration management computer system may be configured to periodically identify whether a component at the data center is to be upgraded to a newer version. For example, the platform template may include one or more applications installed on one or more servers processing requests received from users to provide the business functionality. In some cases, the configuration management tool 730 may be configured to determine whether at least one of a software application, a hardware platform, an operating system, or other component associated with the platform template or the POD is to be updated. In some cases, the configuration management tool 730 may be configured to automatically determine whether an update is available for a POD component at an expiration of a specified duration (e.g., monthly, bi-monthly, yearly, and the like). In other cases, the configuration management tool 730 may identify a component to upgrade based on an input received via a user interface. If no components are to be updated, the live POD continues to provide the business function to users at 820.

When the configuration management computer system determines that an update is available for the POD, the configuration management tool 730 may determine whether the upgrade corresponds at least to a hardware update at 835. If the update is determined to include an update to a hardware platform, such as an update to an existing server platform (e.g., a memory upgrade, a processor upgrade, and the like), a replacement server platform (e.g., an expiration of a lease, an end of a life cycle for the server hardware, a change in hardware vendors, and the like), or other such changes, the configuration management computing system that may include the configuration management tool 730 may determine which of the one or more components (e.g., a processor, a server platform, a memory device, and the like) and a version of the components to be updated at 830. For example, the configuration management system may determine that a server platform is to be upgraded from a first model of server to a second model of server, where at least a portion of the components of the second model are different than the components of the first model.

After determining whether or not a hardware update is available for the POD, the configuration management computer system may determine whether an update to an operating system associated with the POD is to be updated at 845. If so, the configuration management tool 730 may determine whether one or more operating system components are to be updated at 840. For example, the configuration management tool may identify whether a major version release (e.g., version 1 to version 2, version 2 to version 3, and the like) or a minor version release, such as an update package, a security patch or the like is available for the hardware platform. In some cases, the operating system update may comprise a change from a first operating system vendor to a second operating system vendor. For example, the IT department of a business organization may implement a policy to move from an operating system offered by a multi-national corporation to using an operating system offered as an open-source operating system.

After determining whether or not an operating system update is available for the POD, the configuration management computer system may determine whether an update to one or more platform template components is available at 850. For example, the configuration management tool 730 may identify an available update to a software application that may be included as part of the platform template. In some cases, this application update may correspond with a determined hardware update and/or a determined operating system update. In some cases, the application update may correspond to an updated version of the particular application being released.

At 860, the configuration management computer system may be configured to generate a new version of the platform template based on one or more of a determined hardware update, a determined operating system update, and an application update. In some cases, the configuration management computer system may generate an updated platform template to incorporate one or more application updates based on whether a hardware update, an operating system update and/or an application update is to be done. In some cases, the configuration management computer system may include a version management system to perform version management functions to monitor versioning of hardware, operating systems, applications, product templates, server templates, and/or platform templates. In some cases, the version management system may identify an existing version of a template to account for the determined update to hardware platform, operating system and/or application. In such cases, the version management system may generate an instance of an existing platform template to be used in upgrading the POD. If, however, an updated template is not available, the version management system may generate a new version of one or more product templates accounting for the any determined updated applications. The version management computer system may then generate a new version of one or more server types that include at least one of the newly generated versions of the product templates. The version management computer system may then update one or more platform templates associated with the POD based on the newly generated versions of the product templates and the server type templates.

At 870, the configuration management system may configure a second POD with an instance of the new version of the platform template. In some cases, this second POD may be included at the data center associated with the first POD. The second POD may be communicatively coupled to the network, but configured as a dark POD until testing of the dark POD has been completed.

At 880, the test computing system 350 may test the operation of the dark POD based on a testing protocol and/or test data stored in the data repository 352 of the test computing system 350. In some cases, the test computing system may, as part of the testing protocol, further test the operation of the dark POD using "live" data received from one or more client devices during communication with the live POD. If one or more performance criteria are met (e.g., a performance time, an error reaction time, and the like), the test computing system 350 may indicate that the dark POD is ready for activation.

At 890, a switching tool (e.g., a swing tool) may then be triggered to deactivate the first POD and activate the second POD, wherein a downtime between the deactivation of the first POD and the activation of the second POD comprises a matter of minutes (e.g., under 1 minute, about 1 minute, about 2 minutes, and the like). Once activated, the second POD may then be used to provide the business functionality to users via a network at 820. In some cases, as part of the activation process, a data repository associated with the second POD may be synchronized with a corresponding data repository associated with the first POD, where the data repositories store, at least in part, information associated with providing the business functionality to the user devices 360.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A system comprising:
an active first point of deployment (POD) communicatively coupled to a plurality of user devices via a network to provide a specified business functionality using client data communicated via the network, the first POD comprising one or more first servers and a first instance of a platform template configured for providing the specified business function by the one or more first servers, wherein the first instance of the platform template includes at least a first instance of a server template and wherein the first instance of the server template includes at least a first instance of a product template and the first instance of the product template includes at least two application templates; and a second POD communicatively coupled to the network, the second POD comprising one or more second servers and a second instance of the platform template operational on the one or more second servers, wherein a first version of the server template of the first instance of the platform template is different than a second version of the server template of the second instance of the platform template and wherein the second POD is actively communicating on the network and is not accessible to users via a user device, wherein the second version of the server template includes at least one difference in the at least two application templates;

backup third POD communicatively coupled to the network, the third POD comprising one or more backup servers and a third instance of the platform template, wherein the third POD is configured to provide the specified business functionality via the network when the active first POD is not in operation, and wherein a version of the third instance of the platform template is the same as the version of the first instance of the platform template; and a POD management computing device communicatively coupled to the network, wherein the POD management computing device uses at least a portion of live client data for testing the second POD in parallel with an operation of the first POD processing the same live data and wherein, after completion of the testing, the POD management computing device deactivates the first POD and activates the second POD to provide the specified business function using the second instance of the platform template, wherein upon activation of the second POD, the first POD is configured as a backup POD, the second POD is configured as the active POD and the third POD is configured as a dark POD to be configured with an updated version of the platform template.

2. The system of claim 1, wherein the platform template comprises one or more server templates and each server templates comprises one or more product templates and each product template comprises one or more applications and a specified order of installation of the one or more applications onto a computing device.

3. The system of claim 2, wherein an instance of the platform template comprises a set of installation packages for installing the one or more applications onto one or more servers associated with a POD using the specified order of installation.

4. The system of claim 3, further comprising:
a configuration management computing device communicatively coupled to the network, the configuration management computing device comprising:
a data repository storing one or more platform templates;
a processor communicatively coupled to the data repository; and
a non-transitory memory device communicatively coupled to the processor, the non-transitory memory device storing instructions that, when executed by the processor, cause the configuration management computing device to:
identify a first version of the platform template, wherein the first version corresponds to the version of the first instance of the platform template;
determine whether a second version of the platform template is available in the data repository, wherein the second version is newer than the first version;
if so, generate the second instance of the platform template based on the second version; and
install the second instance of the platform template onto the one or more servers of the second POD.

5. The system of claim 4, wherein the POD management computing device is configured to minimize downtime during an upgrade of platform template providing the specified business functionality from the first version of the platform template to the second version of the platform template.

6. The system of claim 1, further comprising:
a first data repository associated with the first POD, the first data repository storing client information associated with the one or more business functions; and
a second data repository associated with the second POD, wherein POD management computing device synchronizes the second data repository with the first data repository when activating the second POD.

7. The system of claim 1 further comprising:
a switching tool communicatively coupled to the first POD and the second POD via the network, wherein the switching tool identifies whether a data packet on the network is to be routed to the first POD, the second POD or both the first POD and the second POD.

8. The system of claim 7, wherein the switching tool identifies an origination location of the data packet and routes the data packet to the second POD when the origination location is associated with a testing computing system.

9. The system of claim 7, wherein the switching tool, in response to an activation command, switches active client communication received via the network from the first POD to the second POD to deactivate the first POD and to activate the second POD.

10. The system of claim 1, wherein the first POD and the second POD each include at least one of a login server, an application server, a user interface server, and a policy server.

11. A system comprising:
an active first point of deployment (POD) comprising a first data center configured to provide a business functionality to a user via a network, the first POD comprising a first plurality of servers configured to operate using a first version of a platform template;
a dark second POD comprising a second data center configured to provide a same business functionality using a second plurality of servers, the second POD configured to operate using a second version of the platform template, wherein the second version comprises an upgrade of at least one hardware component of the platform template and wherein the second POD is actively communicating on the network and is not accessible to users via a user device; and
a third backup POD comprising a third data center configured to provide the business functionality to the user via the network when the active POD is not available via the network, the third backup POD comprising a first plurality of servers configured to operate using a first version of a platform template; and
wherein an upgrade of at least one component of the platform template is performed by switching user communication from the first POD to the second POD, and wherein upon activation of the second POD, the first POD is configured as a backup POD, the second POD is configured as the active POD and the third POD is configured as the dark POD to be configured with an updated version of the platform template.

12. The system of claim 11, further comprising:
a configuration management computing device comprising a:
processor; and
a non-transitory memory storing instructions that, when executed by the processor, cause the configuration management computing device to:
identify at least one component of the platform template that has been upgraded since a release of the first version of the platform template;
generate an installation package associated with the second version of the platform template including at least one identified upgraded component; and
installing an instance of the second version of the platform template on one or more devices included in the second POD.

13. The system of claim 12, wherein the configuration management computing device further comprises a data repository storing a set of installation packages associated with the platform template, wherein each installation package corresponds to an instance of a particular version of the platform template.

14. The system of claim 11, further comprising:
a test data repository communicatively coupled to the network; and
a testing computing device communicatively coupled to the network and the test data repository, wherein the testing computing device is configured to test the second version of the platform template on the second POD using information stored in the test data repository.

15. The system of claim 14, wherein the testing computing device is further configured to test the second version of the platform template on the second POD using information received from a user device via the network.

16. The system of claim 15, wherein the testing computing device provides a configuration file to a switching tool, wherein the configuration file identifies a first set of components of the platform template to be tested using data received from the user and a second set of components of the platform template to be tested using information retrieved from the data repository.

17. A method comprising:
identifying, by a version manager, a first version of a platform template operational at a first point of deployment (POD) as an active POD for providing a business functionality to a user via a network, wherein the first point of deployment comprises a data center including one or more servers;
determining, by a configuration management computing device, whether a second version of a platform template stored in a template repository is ready for deployment, wherein the second version is different than the first version;
when the second version of the platform template is ready for deployment, configuring, by the configuration management computing device, a second POD at the data center to operate using an instance of a second version of the platform template comprising an updated version of an associated server template, wherein the second POD is configured as a dark POD that is actively communicating on the network and is not accessible to the user via a user device;
activating, by a switching tool, the second POD by routing communications received from one or more user devices via the network to the second POD;
deactivating, by the switching tool, the first POD, wherein upon activation of the second POD, the first POD is configured as a dark POD, the second POD is configured as the active POD;
identifying an error with operation of the second POD after activation; and
in response to the error, reactivating the first POD as the active POD and reverting the second POD as the dark POD.

18. The method of claim 17 comprising:
testing, by a testing computing device, an operation of the second POD while the first POD continues to provide the business functionality to the user via the network; and
determining, by the testing computer device, whether one or more benchmarks have been met.

19. The method of claim 18, further comprising:
generating, by an application template generator, one or more product templates using one or more applications, an order of installation of the applications on a computing device, and a configuration file for configuring operation of the one or more applications;
generating, by a server template generator, one or more server templates comprising one or more product templates, wherein at least one server template comprises a login server template, an application server template, a user interface server template, or a policy server template; and
generating, by a platform template generator, one or more platform templates comprising one or more server templates, wherein a platform template corresponds to a data center installation configured to provide the business functionality to the user and includes at least one of a login server, an application server, a user interface server, or a policy server.

* * * * *